(12) United States Patent
Niemann et al.

(10) Patent No.: US 10,604,096 B2
(45) Date of Patent: Mar. 31, 2020

(54) METHOD FOR DETECTING A CONTACT EVENT ON THE OUTER SHELL OF A VEHICLE AND VEHICLE WITH A SENSOR DEVICE FOR DETECTING CONTACT EVENTS ON THE OUTER SHELL OF THE VEHICLE

(71) Applicant: HELLA GmbH & Co. KGaA, Lippstadt (DE)

(72) Inventors: Thomas Niemann, Delmenhorst (DE); Christian Jurgens, Stuttgart (DE); Patrick Fuchs, Leonberg (DE); Hauke Baumgartel, Delmenhorst (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 15/965,609

(22) Filed: Apr. 27, 2018

(65) Prior Publication Data
US 2018/0312126 A1 Nov. 1, 2018

(30) Foreign Application Priority Data
Apr. 27, 2017 (DE) .................. 10 2017 109 009

(51) Int. Cl.
*B60R 21/0136* (2006.01)
*H04R 1/02* (2006.01)
(Continued)

(52) U.S. Cl.
CPC ........ *B60R 21/0136* (2013.01); *B60R 25/102* (2013.01); *B60R 25/30* (2013.01);
(Continued)

(58) Field of Classification Search
CPC .............. B60Q 9/00; B60W 2050/143; B60W 2420/54; B60W 2550/10; B60W 2422/90; G01N 29/14; G01N 29/2437
See application file for complete search history.

(56) References Cited

U.S. PATENT DOCUMENTS 9,452,726 B2 9/2016 Niemann et al.
2014/0156106 A1 6/2014 Niemann et al.
(Continued)

FOREIGN PATENT DOCUMENTS

DE 102006012336 A1 11/2006
DE 102012023393 A1 6/2014
(Continued)

*Primary Examiner* — Omeed Alizada
(74) *Attorney, Agent, or Firm* — Muncy, Geissler, Olds & Lowe, P.C.

(57) ABSTRACT

With a method for detecting a contact event on the outer shell of a vehicle, wherein at least one structure-borne sound signal is detected by means of a structure-borne sound sensor, the detected structure-borne sound signal is evaluated by an evaluation device, and wherein the vehicle comprises a number of structure-borne sound sensors, it is provided as essential to the invention that each of the structure-borne sound sensors is associated with an area of the vehicle outer shell via a structure-borne sound conducting link, that an evaluation device is used to ascertain, by which of the structure-borne sound sensors respectively, a structure-borne sound signal has been detected, that conclusions are drawn from the association of the structure-borne sound sensors as to the area of the vehicle outer shell which has been touched, and that conclusions are drawn from the area of the vehicle shell which has been touched, as to the kind of underlying contact.

13 Claims, 1 Drawing Sheet

(51) Int. Cl.
*B60R 25/34* (2013.01)
*B60R 25/102* (2013.01)
*B60R 25/32* (2013.01)
*B60R 25/30* (2013.01)
*B60R 21/013* (2006.01)

(52) U.S. Cl.
CPC .............. *B60R 25/32* (2013.01); *B60R 25/34* (2013.01); *H04R 1/025* (2013.01); *B60R 2021/01302* (2013.01); *B60R 2325/106* (2013.01); *B60R 2325/205* (2013.01); *H04R 2499/13* (2013.01)

(56) References Cited

U.S. PATENT DOCUMENTS

| | | |
|---|---|---|
| 2015/0212189 A1 | 7/2015 | Kneifel et al. |
| 2016/0266070 A1 | 9/2016 | Baumgartel |

FOREIGN PATENT DOCUMENTS

| | | |
|---|---|---|
| DE | 102014001258 A1 | 7/2015 |
| DE | 102015003341 A1 | 9/2016 |

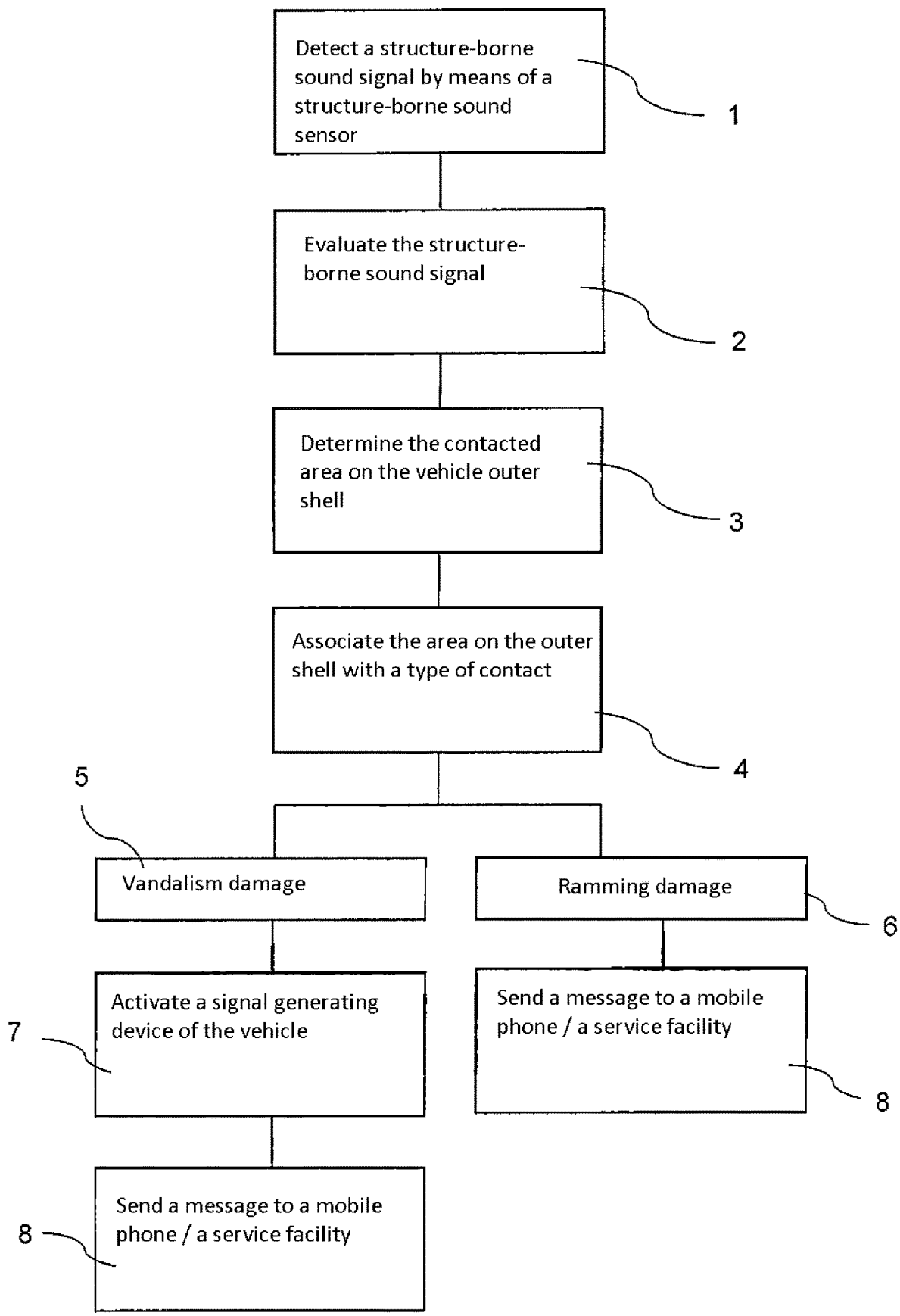

METHOD FOR DETECTING A CONTACT EVENT ON THE OUTER SHELL OF A VEHICLE AND VEHICLE WITH A SENSOR DEVICE FOR DETECTING CONTACT EVENTS ON THE OUTER SHELL OF THE VEHICLE

The invention relates to a method for detecting a contact event on the outer shell of a vehicle, wherein at least one structure-borne sound signal is detected by means of at least one structure-borne sound sensor, the detected structure-borne sound signal is evaluated by an evaluation device and wherein the vehicle comprises a number of structure-borne sound sensors. The invention relates further to a vehicle with a sensor device for detecting contact events on the outer shell of the vehicle, wherein the sensor device comprises at least one structure-borne sound sensor and wherein the sensor device has at least one evaluation device associated with it for evaluating the detected structure-borne sound signals.

Sensor systems for detecting contact events are used in a plurality of vehicles, in particular for detecting accident events. This can be accomplished with the aid of structure-borne sound sensors which are connected to the outer shell of the vehicle in a structure-borne sound conducting manner. If the vehicle outer shell comes into contact with an external object, a structure-borne sound signal is generated on the vehicle outer shell, which propagates on the outer shell of the vehicle. By detecting and evaluating a structure-borne sound signal it can thus be ascertained, whether a contact event has taken place on the outer shell of the vehicle and whether this has resulted in accidental damage.

The disadvantage with the known state of the art is that there is no easy way of differentiating between a traffic accident causing considerable damage and a contact event incurred during a parking manoeuvre, with no or only minor damage.

It is the aim of the invention to propose a method, with which it becomes easy to assess the type of contact.

The problem is solved using a method with the characteristics of patent claim 1 as well as a vehicle with the characteristics of patent claim 12. Advantageous embodiments and further developments are cited in the sub-claims.

With a method for detecting a contact event on the outer shell of a vehicle, wherein at least one structure-borne sound signal is detected by means of at least one structure-borne sound sensor, the detected structure-borne sound signal is evaluated by an evaluation device, and wherein the vehicle comprises a number of structure-borne sound sensors, it is provided as essential to the invention, that the structure-borne sound sensors are each associated with an area of the vehicle outer shell via respectively structure-borne sound conducting links, that it is ascertained by means of the evaluation device, by which of the structure-borne sound sensors a respective structure-borne sound signal is detected, that conclusions are drawn from the association of the structure-borne sound sensors as to the area of the vehicle shell which was touched, and that conclusions are drawn from the area of the vehicle shell which was touched, as to the type of underlying contact.

Structure-borne sound sensors are arranged at various positions on the outer shell of a vehicle. Three sensors may, for example, be arranged in the front area, wherein one sensor is arranged in the centre and two structure-borne sound sensors are arranged situated on the sides. Furthermore structure-borne sound sensors may be arranged in the mud guards as well as in the doors. The rear area also may comprise structure-borne sound sensors, wherein for example two sensors are arranged laterally and one structure-borne sound sensor is arranged centrally in the tailgate. Two further structure-borne sound sensors may be arranged in the roof of the vehicle. Each structure-borne sound sensor thus has a certain area of the outer shell of the vehicle associated with it. If certain areas on the outer shell are contacted, this is detected in the first place by the structure-borne sound sensor associated with it. By means of the evaluation device it can be determined, by which structure-borne sound sensor the respectively evaluated signal was detected. This allows the position on the outer shell/the area on the outer shell of the vehicle in which the source of the structure-borne sound signal is located to be determined. From the position of the source of the structure-borne sound signal conclusions can be drawn as to the damage/the type of contact. For example, contact events or damages due to vandalism would occur predominantly in the area of the vehicle roof, the front bonnet, the tailgate and in the upper area of the doors. The bumpers and the lower area of the doors are usually susceptible to contact made during parking or other minor contact events. By associating the structure-borne sound sensors with different areas of the vehicle outer shell and by associating different kinds of contact with different areas, it becomes easy to predict what type of damage is indicated by a detected structure-borne sound signal.

With a further development of the method, a stimulation of the structure-borne sound sensors associated exclusively with the roof and/or the front bonnet and/or the tailgate leads to the conclusion of damage to due vandalism. In particular if the vehicle is locked the damage may be due to vandalism. This may take the form of scratches, for example with a sharp-edged object, mainly on the front bonnet, the tailgate, the roof area or the upper area of the doors. If a structure-borne sound sensor is stimulated by a contact exclusively in these areas of the vehicle, the evaluation device may predict that the damage is due to vandalism.

With a further development of the invention, if only the structure-borne sound sensors associated with the bumpers and/or the lower door area are stimulated, the conclusion drawn is ramming damage. When only the bumpers, i.e. the front bumper/the rear bumper, or the lower door areas are contacted then these are in the main contacting or ramming events by for example other road users, in particular due to parking manoeuvers. These normally occur unnoticed, when the vehicle is locked. If the structure-borne sound sensors located in the said areas are stimulated, the conclusion may be drawn by the evaluation device that the damage is due to tailgating or ramming. If stimulation is limited to the structure-borne sound sensors associated with the mud guards, the damage may be caused by either ramming or vandalism.

With a further development of the method, if damage due to vandalism is determined, a control signal for actuating a signalling device is emitted. The signalling device of the vehicle may be for example the hazard warning lights, the full-beam headlights or the horn. If vandalism damage is determined, in particular if the vehicle is locked, a control signal may be sent to the signal generator by the evaluation device and/or by a control device, so that a person causing the vandalism damage may be driven away by, for example, the actuation of the horn and/or the hazard lights.

With an alternative embodiment of the method, if the structure-borne sound sensors associated with the roof and/or the front bonnet and/or the tailgate and/or the bumpers and/or the door area are stimulated, it is concluded that the outer shell of the vehicle has been damaged. The areas on the vehicle outer shell are particularly susceptible to damage by, for example, contact with external objects. In particular if the vehicle is parked in a carpark there is a chance of ramming damage or vandalism damage. Due to stimulation of the structure-borne sound sensors which are associated with the various areas of the outer shell, damage to the vehicle shell can be detected and the position of the damage can be ascertained.

With a further development of the method, if the vehicle is locked and a contact event is determined, a message is sent to a previously determined mobile phone. If a structure-borne sound signal is detected by the structure-borne sound sensors, which due to the location of the structure-borne sound source indicates that there is vandalism damage or tailgating damage, a message may be sent to the mobile phone of the vehicle owner/the vehicle user. The message enables the vehicle user to return to his vehicle in order to, as necessary, establish the exact facts in situ.

With a further development of the method, the message to be sent is stored on the vehicle side if it is not possible for the vehicle to establish a connection with the internet, and the message will be sent to the determined mobile phone as soon as a connection of the vehicle with the internet is established again. If the transmitting device of the vehicle is temporarily unable to establish a data connection, a respective message may be sent, when the data connection, in particular an internet connection, is re-established. To this end there may exist the possibility to store information about contact events in a local digital storage device of the vehicle. The information may also, for example on return of the vehicle user, be displayed to him on a display device, for example a central display, or the information may be read out by an external service facility such as a specialist workshop.

With a further development of the method, if a contact event is detected by a structure-borne sound sensor, a message is sent to an external facility with information on the contact event. If it is established that damage is due to vandalism or tailgating, a message may be sent to an external facility such as a service facility, where the facts can be examined in detail. If there is sufficient evidence of vandalism damage, the vehicle owner or vehicle user can be contacted by the service facility and police may also be notified.

With a further development of the method, a number of structure-borne sound sensors are associated with an area of the outer shell of the vehicle. By arranging a number of structure-borne sound sensors in different areas of the vehicle outer shell it becomes possible to obtain more accurate information on the places which have been damaged and possibly also on the type of damage.

With a further development of the method, the number of structure-borne sound sensors from which a structure-borne sound signal on the outer shell of the vehicle has been detected, is ascertained by means of the evaluation device, and from the ascertained number of structure-borne sound sensors conclusions are drawn as to the intensity of the contact which underlies the detected structure-borne sound signal. A number of structure-borne sound sensors may be arranged on the outer shell of the vehicle, in particular on the inside of the outer shell. For example, sensors may be arranged in the front and rear areas, on the doors as well as in the roof area. Structure-borne sound signals arising from contacts with the outer shell, for example with external objects, can be detected by the structure-borne sound sensors. If the contact of the external object with the outer shell is slight, the intensity of the structure-borne sound signal created is low, and the propagation radius on the outer shell can be covered by a single structure-borne sound sensor. A structure-borne sound signal, which is detected by merely a single structure-borne sound sensor, is therefore associated with only a slight contact with the outer shell of the vehicle. This may involve a slight deformation of the outer shell for example in the form of an indent. If the contact between an object and the outer shell is more pronounced, the propagation radius is larger than with only a slight contact, because the structure-borne sound vibration has a larger amplitude and the structure-borne sound vibration can thus spread further on the outer shell, before the vibration subsides. If two structure-borne sound sensors are stimulated by the structure-borne sound signal of a contact, the conclusion is that a stronger contact with the outer shell of the vehicle has taken place. Thus a simple way has been created of predicting the intensity of a contact with the outer shell of the vehicle. If a structure-borne sound signal from a number of structure-borne sound sensors has been detected, the conclusion is a serious accident. In case of detecting a serious accident an automatic message may be sent to an external service facility, such as an emergency call centre. For example threshold values can be provided, which indicate a minimum number of structure-borne sound sensors which have detected the structure-borne sound signal and/or which indicate the minimum amplitude of the detected structure-borne sound signal and where, if they are exceeded, an automatic message is issued.

With a further development of the method a structure-borne sound signal is detected by at least two structure-borne sound sensors, at least one signal amplitude of the structure-borne sound signal is determined by an evaluation device, the signal propagation times of the structure-borne sound signal are determined at each of the structure-borne sound sensors which have detected the structure-borne sound signal, and the signal amplitudes and signal propagation times are used to draw conclusions as to the point of impact and the severity of the accident of a contact with an object on the outer shell of the vehicle. A defined area of the outer shell may have a number of structure-borne sound sensors associated with it. If there is contact of an object with the outer shell in this area, a developing structure-borne sound signal is thus detected by a number of structure-borne sound sensors. The detected structure-borne sound signals can be evaluated by an evaluation device, wherein in particular the amplitudes of the structure-borne sound signals can be determined. Furthermore the propagation times of the structure-borne sound signals can be determined on the respective structure-borne sound sensors. In particular this allows the propagation time difference of a structure-borne sound signal between the different structure-borne sound sensors which have detected the signal, to be determined. The propagation time differences can be used to draw conclusions as to the exact point of impact of an object on the outer shell of the vehicle. To this end the positions of the structure-borne sound sensors may be known and stored in the evaluation device. From the recorded parameters conclusions may be drawn as to the size of an object, with which the outer shell of the vehicle had come into contact or as to the severity of the accident which was caused by the contact with the object.

Furthermore the invention relates to a vehicle with a sensor device for detecting contact events on the outer shell of the vehicle, wherein the sensor device is associated with at least one evaluation device for evaluating the detected structure-borne sound signals, with which it is provided as essential to the invention that each of the structure-borne sound sensors is associated with a defined area of the outer shell of the vehicle by means of a structure-borne sound conducting connection. Structure-borne sound sensors may be arranged in particular in various areas on the outer shell of a vehicle, in particular on the inside of the outer shell. Due to a structure-borne sound sensor being fixedly associated with a defined area of the outer shell conclusions can be drawn, due to detecting a structure-borne sound signal and due the structure-borne sound sensor, as to the area of the outer shell, where contact has taken place. Therefore it is possible to associate the point of contact with a type of contact such as tailgating damage or vandalism damage.

In a further development of the invention the vehicle comprises a transmission device for transmitting a message to a mobile phone and/or an external facility. If a contact event is established, which was caused by for example a tailgating accident, causing, in particular, parking or vandalism damage, a message containing the predicted damage may be sent to the mobile phone of the vehicle owner or to an external facility, in particular a service facility. Furthermore the vehicle may comprise a storage device for locally storing the information relating to the contact events. This information may be displayed to the vehicle user via a display device such as a central display, or read out by a service facility, in particular a workshop.

With a further development of the invention the evaluation device is connected to a signalling device of the vehicle in a control-signal-conducting manner. In particular, if vandalism damage is established a control signal may be sent to a signal generator of the vehicle. The signalling device may, for example be the horn, hazard lights, warning lights or full-beam headlights. If vandalism is established, the horn and the hazard warning lights may be triggered so that a person who has caused the vandalism damage can be frightened away.

The invention will now be explained further by way of an exemplary embodiment shown in the drawing, in which, in detail:

Sole FIGURE: shows a schematic flow diagram illustrating the method according to the invention.

The sole FIGURE is a schematic illustration of a flow sequence according to the invention. A structure-borne sound signal generated by a contact is detected 1 by means of a structure-borne sound sensor. The structure-borne sound sensors arranged on the vehicle are each associated with a certain area of the outer shell of the vehicle. The detected structure-borne sound signals are evaluated 2 by means of an evaluation device. Due to associating a structure-borne sound sensor to a defined area of the vehicle outer shell it is possible to determine 3 the area of the vehicle outer shell which was contacted. Certain types of contact are associated 4 with certain areas of the outer shell of the vehicle. For example, vandalism damage is in the main caused on the engine bonnet, the tailgate, the roof area and the upper area of doors, whilst tailgating damage, such as incurred during parking, more likely occurs on bumpers and the lower area of the doors. In case of potential vandalism damage 5 a signal activating a signalling device of the vehicle may be emitted 7. The signalling device may be the horn, the hazard warning lights or the full-beam headlights. By activating a signalling device a person causing vandalism damage for example may be frightened away. In addition a message containing the information about a potential vandalism damage can be sent 8 to a mobile phone or a service facility. If tailgating damage or ramming damage 6 is established, a message may be sent 8 to a mobile phone, for example the mobile phone of the vehicle user, and/or a service facility. Based on the message the vehicle user can decide, whether to return to the vehicle in order to directly establish the facts.

All features mentioned in the above description and in the claims, selected at random, can be combined with the features of the independent claims. The disclosure of the invention is thus not limited to the described and claimed feature combinations, rather all feature combinations meaningful in terms of the invention are regarded as disclosed.

The invention claimed is:

1. A method for detecting a contact event on the outer shell of a vehicle, wherein the vehicle comprises a number of structure-borne sound sensors, the method comprising:
   associating each of the structure-borne sound sensors with a respective area of the vehicle outer shell,
   associating the respective area of the vehicle outer shell with a type of contact,
   detecting at least one structure-borne sound signal by at least one of the structure-borne sound sensors,
   ascertaining which of the structure-borne sound sensors has detected the at least one structure-borne sound signal,
   determining from the association of the structure-borne sound sensors as to the area of the vehicle outer shell which has been touched, and
   determining directly from the area of the vehicle outer shell, which has been touched, as to the type of underlying contact,
   wherein for an exclusive stimulation of the structure-borne sound sensors associated with a roof and/or a front bonnet and/or a tailgate, the conclusion drawn is damage due to vandalism, and
   wherein for an exclusive stimulation of the structure-borne sound sensors associated with bumpers and/or a lower door area, the conclusion drawn is ramming damage.

2. The method according to claim 1, wherein for a stimulation of the structure-borne sound sensors associated with the roof and/or the front bonnet and/or the tailgate and/or the bumpers and/or the door area, the conclusion drawn is damage to the outer shell of the vehicle.

3. The method according to claim 1, wherein if a contact is determined in case of a locked vehicle, a message is transmitted to a previously determined mobile phone.

4. The method according to claim 3, wherein the message to be transmitted is stored on the vehicle side in case a connection of the vehicle with the internet cannot be established, and the message is transmitted to the determined mobile phone as soon as a connection of the vehicle to the internet is established.

5. The method according to claim 1, wherein if damage through vandalism is established, a control signal is emitted by a control device of the vehicle for actuating a signalling device, for example a hazard warning light and/or the horn.

6. The method according to claim 1, wherein a message with information about the contact event is transmitted to an external facility.

7. The method according to claim 1, wherein a number of structure-borne sound sensors are associated with an area on the outer shell of the vehicle.

8. The method according to claim 1, wherein the number of structure-borne sound sensors by which a structure-borne sound signal has been detected on the outer shell of the vehicle, is ascertained by the evaluation device, and from the ascertained number of structure-borne sound sensors, a conclusion is drawn as to the intensity of the contact which was the underlying cause of the structure-borne sound signal.

9. The method according to claim 1, wherein
a structure-borne sound signal is detected by at least two structure-borne sound sensors,
at least one signal amplitude of the structure-borne sound signal is determined by an evaluation device,
the signal propagation times of the structure-borne sound signal is determined on each of the structure-borne sound sensors, by which the structure-borne sound signal was detected, and
from the signal amplitudes and the signal propagation times, a conclusion is drawn as to the location of impact and the resulting severity of the accident of a contact of an object with the outer shell of the vehicle.

10. A vehicle with a sensor device for detecting contact events on the outer shell of the vehicle, wherein the sensor device comprises structure-borne sound sensors and at least one evaluation device for evaluating the detected structure-borne sound signals associated therewith, wherein
a plurality of areas of the outer shell of the vehicle are respectively associated with a type of contact,
each of the structure-borne sound sensors is associated with respective one of the plurality of areas of the outer shell of the vehicle by way of a structure-borne sound conducting connection and detects a structure-borne sound signal,
the evaluation device is used to ascertain which of the structure-borne sound sensors has detected the structure-borne sound signal,
the evaluation device determines from the association of the structure-borne sound sensors as to the area of the vehicle outer shell which has been touched, and
the evaluation device determines directly from the area of the vehicle outer shell, which has been touched, as to the type of underlying contact,
wherein for an exclusive stimulation of the structure-borne sound sensors associated with a roof and/or a front bonnet and/or a tailgate, the conclusion drawn is damage due to vandalism, and
wherein for an exclusive stimulation of the structure-borne sound sensors associated with bumpers and/or a lower door area, the conclusion drawn is ramming damage.

11. The vehicle according to claim 10, wherein the evaluation device is connected with a signalling device of the vehicle in a control-signal conducting manner.

12. The method according to claim 10, wherein the vehicle comprises a transmission device for transmitting a message to a mobile phone and/or an external facility.

13. A method for detecting a contact event on the outer shell of a vehicle having a roof, a front bonnet, bumpers, tailgate and a lower door area, wherein the vehicle comprises a number of structure-borne sound sensors, the method comprising:
associating the number of the structure-borne sound sensors respective with a plurality of areas of the vehicle outer shell, the plurality of areas being associated with the roof, the front bonnet, the bumpers, the tailgate and the lower door area,
associating the respective area of the vehicle outer shell with a type of contact,
detecting at least one structure-borne sound signal by at least one of the structure-borne sound sensors,
ascertaining which of the structure-borne sound sensors has detected the at least one structure-borne sound signal,
determining from the association of the structure-borne sound sensors as to the area of the vehicle outer shell which has been touched,
determining directly from the area of the vehicle outer shell, which has been touched, as to the type of underlying contact,
for an exclusive stimulation of the structure-borne sound sensors associated with the roof and/or the front bonnet and/or the tailgate, determining that damage is due to vandalism, and
for the exclusive stimulation of the structure-borne sound sensors associated with the bumpers and/or the lower door area, determining that the damage is ramming damage.

* * * * *